Jan. 11, 1955

C. O. RICHARDS 2,699,351

LATCH MECHANISM AND CONTROL MEANS THEREFOR

Filed March 30, 1950

INVENTOR.
COURTLAND O. RICHARDS, DECEASED,
BY HENRY A. PLATT, EXECUTOR
BY

Hyde, Meyer, Baldwin & Doran
ATTORNEYS

Jan. 11, 1955

C. O. RICHARDS

2,699,351

LATCH MECHANISM AND CONTROL MEANS THEREFOR

Filed March 30, 1950

INVENTOR.
COURTLAND O. RICHARDS, DECEASED,
BY HENRY A. PLATT, EXECUTOR
BY

*Hyde, Meyer, Baldwin & Doran*
ATTORNEYS

Jan. 11, 1955

C. O. RICHARDS

2,699,351

LATCH MECHANISM AND CONTROL MEANS THEREFOR

Filed March 30, 1950

INVENTOR
COURTLAND O. RICHARDS, DECEASED.
BY HENRY A. PLATT, EXECUTOR
BY

Hyde, Meyer, Baldwin & Doran
ATTORNEYS

Jan. 11, 1955  C. O. RICHARDS  2,699,351
LATCH MECHANISM AND CONTROL MEANS THEREFOR
Filed March 30, 1950
6 Sheets-Sheet 5

INVENTOR.
COURTLAND O. RICHARDS, DECEASED
BY HENRY A. PLATT, EXECUTOR
BY
Hyde, Meyer, Baldwin & Doran
ATTORNEYS Jan. 11, 1955

C. O. RICHARDS 2,699,351

LATCH MECHANISM AND CONTROL MEANS THEREFOR

Filed March 30, 1950

INVENTOR.
COURTLAND O. RICHARDS, DECEASED,
BY HENRY A. PLATT, EXECUTOR
BY

Hyde, Meyer, Baldwin & Doran
ATTORNEYS

United States Patent Office 2,699,351
Patented Jan. 11, 1955

2,699,351

LATCH MECHANISM AND CONTROL MEANS THEREFOR

Courtland O. Richards, deceased, late of Detroit, Mich., by Henry A. Platt, executor, Berkley, Mich.

Application March 30, 1950, Serial No. 152,864

32 Claims. (Cl. 292—254)

This invention relates to latch devices for releasably retaining two relatively movable members in a particular relationship, such as a closed relationship if one of said members is a closure. Although latch devices embodying the present invention are useful with various relatively movable members, said devices are particularly useful, as will hereinafter more fully appear, with the doors, hoods and deck lids of automobiles and like vehicles.

The present invention has for its primary object the provision of a latch device which is characterized by its structural simplicity, the economy of its manufacture, the ease and convenience of its installation, its dependability in use, and its general operating efficiency.

A more specific object of the present invention is the provision of a latch device which, when used with a closure subjected to vibration, such as the door, hood or deck lid of an automobile, truck or like vehicle, effectively absorbs or cushions all such vibrations.

A further more specific object of the present invention is the provision of a latch device which enables the closure with which it is used to be securely held in a plurality of closed positions to which it may be moved, either forcibly or gently, and yet which enables the closure to be readily opened when desired.

A further more specific object of the present invention is the provision of a latch device having retainable means in the form of a rigid and immovably mounted latch bolt, and retaining means in the form of a cooperating keeper element which is put under torsional stress for the releasable retention of said latch bolt and hence, for the releasable retention in closed position of the closure with which the device is used.

A further more specific object of the present invention is the provision of a latch device in which the keeper element, for the releasable retention of the latch bolt, includes a rubber-like body which is bonded or equivalently secured to the support therefor and which, upon the closing of the closure with which the device is used, is automatically put under torsional stress for retaining engagement with said latch bolt to thereby effect the releasable retention of the closure in closed position, the closed position being either a fully closed position or a partly closed position.

A further more specific object of the present invention is the provision of a latch device in which the latch bolt has associated therewith simple and improved means for releasing the latch bolt from retention by its cooperating keeper when opening movement is desired of the closure with which the device is used.

A further more specific object of the present invention is the provision of a latch device having two opposed keeper elements between and by which the latch bolt is releasably retained upon the movement to closed position of the closure with which the device is used, each of said keeper elements having a rubber-like body which is put under torsional stress for the releasable retention of said latch bolt.

A further more specific object of the present invention is the provision of a latch device in which the latch bolt is provided with opposed sets of ratchet teeth which are retainably engaged by projections of the torsional keeper elements for the releasable retention of the latch bolt between such projections, and in which said latch bolt has associated therewith outwardly or divergently movable means for forcibly releasing the keeper projections from the latch bolt teeth to thereby free the latch bolt from retention by said keeper elements, and to maintain said keeper projections in release relationship relative to said latch bolt teeth during the withdrawal of the latch bolt from a position between the keeper elements as the closure with which the device is used is moved to an open position.

A further more specific object of the present invention is the provision of a latch device in which the latch bolt is provided with two laterally spaced portions between which is arranged the latch bolt release means, and in which said latch bolt portions are provided with laterally aligned abutments, such as ratchet teeth, which are retainably engaged by a keeper element for the releasable retention in closed position of the closure with which the device is used.

A further more specific object of the present invention is the provision of a latch device in which the latch bolt is provided with opposed sets of abutments, such as ratchet teeth, which are retainably engaged by aligned projections of two opposed keeper elements for the retention in closed position of the closure with which the device is used, the teeth of one set being staggered with respect to the teeth of the other set, with the result that the closure, when closed, has a take-up adjustment in half-tooth increments, thereby substantially doubling the number of closed positions in which the closure may be releasably retained.

A further more specific object of the present invention is the provision of a latch device in which the keeper element or elements have associated therewith "safety catch" means for retaining engagement with the latch bolt to prevent accidental release thereof in the event that the keeper element or elements are incapable of or fail, for any reason, to perform such function.

A further more specific object of the present invention is the provision of a latch device which includes simple and improved actuating mechanism for the latch bolt release means, and simple and improved operating means, on both the inside and the outside, if desired, of the closure with which the device is used, for said actuating mechanism.

Further objects of the present invention, and many of its practical advantages, will be referred to in or will be evident from the following description of two automobile door latch devices embodying the invention, as illustrated in the accompanying drawings, in which Figs. 1 to 16 inclusive relate to the latch device constituting one embodiment, Figs. 17 to 23 inclusive relate to the latch device constituting a second embodiment, and Figs. 24 to 27 inclusive relate to "safety catch" means which may be used with either embodiment or with other embodiments, and wherein.

Although for purposes of disclosure of the present invention, two latch devices for automobile doors are here illustrated and described, it is to be understood that devices embodying the present invention may be used with other closures, either swingable or slidable, and for the releasable retention or the detachable connection of various relatively movable members, neither of which is a closure. It also is to be understood that the terminology or phraseology herein used is for purposes of description and not of limitation, as the scope of the present invention is denoted by the appendant claims.

Figure 1:
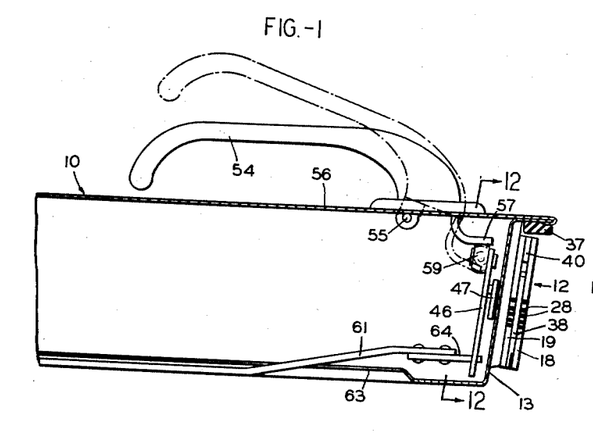
Fig. 1 is a horizontal longitudinal sectional view of a portion of an automobile door which is releasably retained in closed position by a latch device constructed in accordance with one embodiment of the present invention.
Figure 2:
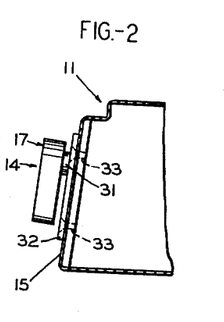
Fig. 2 is a similar view of a portion of the adjacent body post or pillar, to which is secured the keeper of said latch device.

Referring first to Figs. 1 to 16 inclusive, 10 designates an automobile door, a right front door being shown, which is releasably held in latched position by a latch device embodying one form of the present invention. As is usual in automobile door latches, all but the keeper of the present latch device is associated with and carried by the door 10, the keeper being associated with and carried by the adjacent body post or pillar 11. Also as is usual in automobile door latches, the latch bolt 12 of the present latch device is exteriorly mounted, as shown in Figs. 1 and 3, on the free edge wall 13 of the door 10, and the cooperating keeper 14 is exteriorly mounted, as shown in Figs. 2 and 4, on the adjacent edge wall 15 of the body post or pillar 11.

Figure 3:
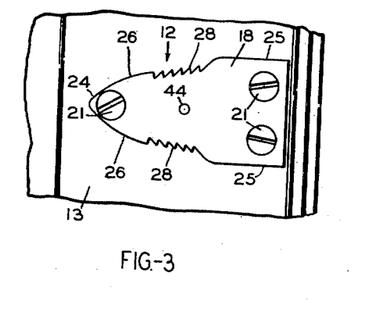
Fig. 3 is an outside elevational view of a portion of the free edge wall of said door and showing the latch bolt as exteriorly mounted on such wall.
Figure 4:
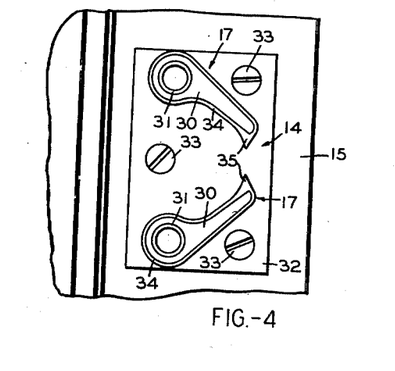
Fig. 4 is a similar view of a portion of the edge wall of the adjacent body post or pillar and showing the keeper as exteriorly mounted on such wall.

However, unlike the movably mounted latch bolts of automobile door latches now in use, the latch bolt 12 of the present latch device is rigidly or immovably mounted on the door edge wall 13, the latch bolt extending transversely of and alongside said door edge wall, as shown in Fig. 3, for movement between and releasable retention by the hereinafter described jaws 17 of the keeper 14 upon the movement of the door 10 to closed position.

Figure 9:
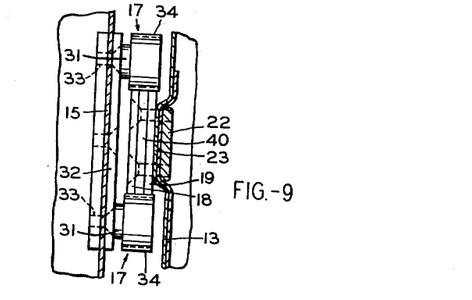
Fig. 9 is a transverse sectional view on the line 9—9 of Fig. 6.
Figure 10:
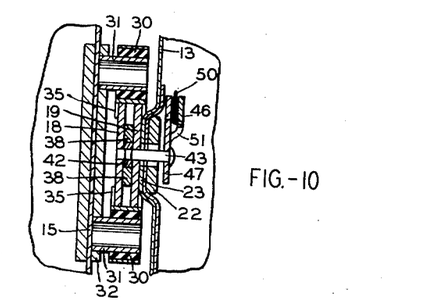
Fig. 10 is a similar view on the line 10—10 of Fig. 6.

In the present embodiment of the invention, the latch bolt 12 comprises two rigid plate-like members 18 and 19, of metal or other suitable material and of identical size and shape, the members being mounted on the door edge wall 13 in aligned, side-by-side relationship, although spaced slightly apart for the reception therebetween of the hereinafter described latch bolt release means. For the rigid or immovable mounting of the two latch bolt members on the door edge wall 13, said members are here provided with registering apertures 20 (Fig. 5) for the reception of screws 21 which extend through said door edge wall and into a backing plate 22 (Figs. 9 and 10) welded or otherwise suitably secured to the inner surface of said wall. In the present embodiment of the invention, the door edge wall portion 23, to which the latch bolt members are secured, is pressed outwardly, as shown in Figs. 9 and 10, to thereby space the upper and lower side edge portions of the latch bolt members from the door edge wall, the purpose of which will hereinafter appear.

Although the size of the latch bolt members 18 and 19 may be varied, as desired, said members preferably are of such shape as to provide them with reduced inner end portions or noses 24 for convenient entrance of the latch bolt members between the hereinafter described bolt-retaining jaws 17 of the keeper 14. As here shown, the upper and lower side edges 25 of the outer end portions of the two bolt members are of straight and generally parallel form, but the upper and lower side edges 26 of the inner end portions of the bolt members are of gradually converging or tapering form to thereby provide the bolt noses 24.

To enable the keeper jaws to retainably engage the bolt members 18 and 19, for the latching of the door 10 in closed position (either a fully closed position or a partially closed position), each of the bolt members is provided in its converging or tapering side edge portions 26 with upper and lower sets of ratchet teeth, the upper teeth of the bolt members being in lateral alignment and the lower teeth thereof also being in lateral alignment. As here shown, said teeth of the bolt members are substantially midway their inner and outer ends but obviously, the location of the bolt teeth, and the number of teeth in each set, may be varied as desired. In the embodiment of the invention here shown, there are five teeth in each set, which provides, of course, a substantial number of partially closed positions in which the door 10 may be held, in addition to what may be regarded as its fully closed position, all as will hereinafter more fully appear.

As heretofore mentioned, the keeper 14 comprises a pair of opposed jaws 17 between which the latch bolt members move, and by which they are releasably held, upon the closing of the door 10. As shown in Fig. 4 and in Figs. 6 to 8 inclusive each of the keeper jaws 17 here comprises an elongated body 30 of elastic deformable rubber (natural or synthetic), the rubber bodies of the two jaws being mounted at their outer ends upon rigid supporting studs 31, with the inner end portions of the jaw bodies extending obliquely inwardly and toward each other for cooperation with the latch bolt members. As best shown in Figs. 4 and 10, the jaw supporting studs 31 are here in the form of short metal tubes, extending from and rigidly secured in suitably spaced relation to a metal plate 32, the plate being rigidly secured, such as by the screws 33, to the edge wall 15 of the body post or pillar 11, with said edge wall being interiorly provided, if desired and as here shown (Fig. 2) with a suitable backing or reinforcing plate to receive said screws.

To enable the keeper jaws to yieldingly receive the latch bolt members 18 and 19 therebetween, and to releasably retain said latch bolt members for the releasable retention of the door 10 in closed position, the outer and here enlarged ends of the rubber bodies 30 of the two keeper jaws are bonded, such as by vulcanization, or are otherwise securely anchored to their supporting studs 31, and said studs, with said rubber bodies bonded thereto, are so secured to the keeper plate 32 that said jaw bodies normally assume the positions or have the spaced relationship shown in Fig. 4.

Figure 8:
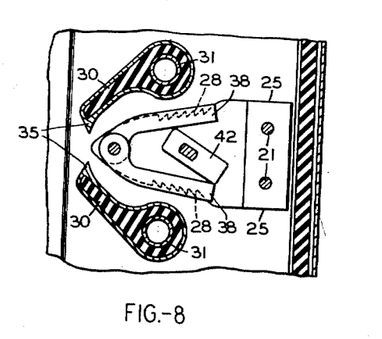
Fig. 8 is a view similar to Figs. 6 and 7, but showing the door partly open, with the latch bolt partially withdrawn from its position between the keeper elements or jaws.

As will be evident from Fig. 8 and also by a comparison of Figs. 3 and 4, the normal positions or spaced relationship of the keeper jaws is such that the free or inner end portions of their rubber bodies 30 are forced further apart or divergently moved upon the movement of the bolt members 18 and 19 between the jaws. As a result, the rubber bodies of the two keeper jaws are put under torsional stress by the movement of the latch bolt members therebetween, and the retention of said bolt members by the keeper jaws is due to or produced by this torsional stress of the rubber jaw bodies.

To protect the jaw bodies 30 and to provide them with rigid projections for retaining engagement with the ratchet teeth 28 of the latch bolt members 18 and 19, said jaw bodies are here provided with peripheral casings or rim members 34, of wear-resisting material, such as metal, said casings or rim members being bonded, such as by vulcanization, to the jaw bodies 30 or otherwise suitably retained in assembly therewith, and being formed at the free or inner ends of said bodies with projections 35 for retaining engagement with the latch bolt ratchet teeth. As will be readily understood, upon the closing of the door 10 and the consequent movement of the latch bolt members between the two opposed keeper jaws, the jaw projections 35, which extend toward each other in aligned relationship, resiliently ride over the latch bolt ratchet teeth 28, but due to the torsional stress under which the jaw bodies 30 are put by the movement of the latch bolt members between the jaw projections 35, said projections effectively prevent, by their engagement with the bolt ratchet teeth, release or withdrawal of the latch bolt members and hence, release of the door from its closed position.

Figure 6:
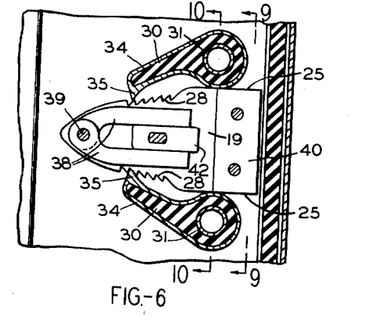
Fig. 6 is a vertical sectional view, showing the retention of the latch bolt by the keeper for the retention of the door in a closed position.

As best shown in Figs. 9 and 10, the keeper jaws are of sufficient width to cooperate with both of the latch bolt members. In Figs. 6, 9 and 10, the door 10 is shown in closed position, a position in which it is releasably latched by the retaining engagement of the keeper jaws with the latch bolt members. Although the relationship of the keeper jaw projections 35 and the latch bolt ratchet teeth 28 may be such that latching of the door is effected by the engagement of both jaw projections back of or behind ratchet teeth on both the upper and lower edges of the latch bolt members, the relationship here shown is such that door latching is effected by having the projection of only one jaw back of or behind latch bolt ratchet teeth. For example, in the closed position of the door in Fig. 6, the projection 35 of the lower keeper jaw is in retaining engagement with two of the lower teeth of the latch bolt members, but the projection of the upper keeper jaw is merely resting on two of the upper teeth of the latch bolt members. However, should the door move further inwardly from the closed position shown in Fig. 6, to what may be regarded as a new closed position of the door, the projection of the upper keeper jaw would immediately move into retaining engagement with two of the upper bolt teeth, for the retention of the door in such new position, and the projection of the lower jaw would merely rest upon two of the lower teeth. As a result, the number of closed positions in which the door 10 can be held or retained is substantially doubled, and there is thus provided an automatic door takeup in increments of half-tooth spacings or distances. This door take-up feature of the present latch device is, of course, of considerable importance, especially with such closures as the doors, hoods and deck lids of automobiles and the like. As is well known, it is the pactice to provide such closures with edge cushioning and sealing strips, such as the door strip 37 here shown, the strips being provided to cushion closing movement of the closures and to provide edge seals therefor. In time, however, these cushioning and sealing strips lose some of their resiliency, and if the latch devices for the closures are of the type, and they usually are, which provide the closures with single *predetermined* closed positions, rattling of the closures result. This is not possible, however, with the present latch device, for if the door 10 can and does move further inwardly, even a distance of one-half a latch bolt ratchet tooth spacing, due to loss of resiliency of the door cushioning strip or strips, one of the projections 35 of the keeper jaws instantly moves to a position in retaining engagement with the upper or lower latch bolt ratchet teeth, and thus securely holds the door in such new closed position. With the present latch device, therefore, a whole range of closed positions is provided in which the door may be securely latched, whether the door is closed forcibly or gently, or whether after being manually closed to one position, the door moves further inwardly to a new position made possible by loss of resiliency of the door cushioning strip or strips.

Figure 7:
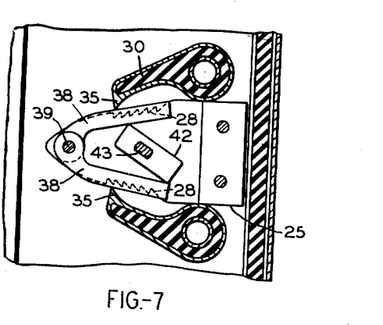
Fig. 7 is a view similar to Fig. 6 but showing the latch bolt released from its retention by said keeper, the door still being in such closed position.

In order to enable the door 10 to be opened from a closed and latched position thereof, it is necessary, of course, to release the door latch bolt from retention by the keeper jaws. Although the release means for this purpose may assume various forms, it preferably is a means associated with the latch bolt, and in this embodiment of the invention, such release means comprises a pair of levers 38 arranged between the members 18 and 19 which jointly constitute the latch bolt. As shown in Figs. 6 to 8 inclusive, these release levers 38 are pivoted at their inner ends on a non-threaded shank portion 39 of the attaching screw 21 which extends through the bolt nose portions 24, the levers normally being in positions between the bases of the upper and lower bolt teeth and hence in non-releasing position, as in Fig. 6. Inasmuch as the two release levers can be, and here are, of less length than the two latch bolt members, a spacing strip 40 may be arranged between the outer end portions of said latch bolt members, to thereby achieve freedom of movement of the release levers and maximum rigidity and durability. As here shown, the spacing strip 40 is retained in place between the outer end portions of the latch bolt members by two of the screws 21 which secure said members to the door edge wall 13.

When opening of the door is desired, the release levers 38 are actuated (by the mechanism hereinafter described) to swing their free end portions divergently to contact and forcibly move the keeper jaw projections out of retaining engagement with the latch bolt ratchet teeth, as in Fig. 7. This permits, of course, the door latch bolt to be withdrawn from its position between the keeper jaws, and the door opened, the keeper jaw projections 35 riding down the now inclined release levers in the movement of the latch bolt from a position between the jaw projections, as indicated in Fig. 8 and as will be readily understood. Upon the closing of the door, the latch bolt release levers 38 automatically return, by their engagement with the keeper jaw projections 35, to their normal positions in spaced relation to the latch bolt teeth, thus enabling the keeper jaws to again retainably engage the door latch bolt for the retention of the door in closed and latched position.

Figure 5:
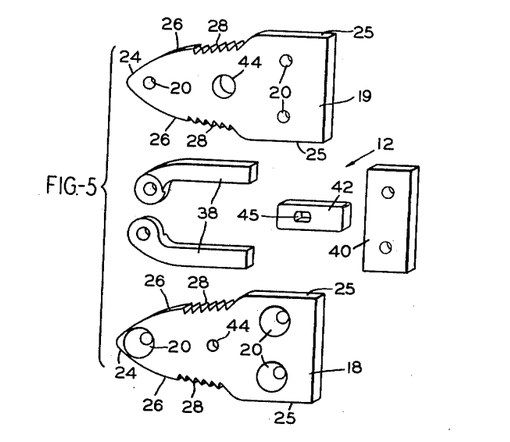
Fig. 5 is a perspective view of the principal parts of said latch bolt and its associated release levers, the parts being in spaced or separated relationship.

For the actuation of the latch bolt release levers, mechanisms of various forms may be utilized. In the present embodiment of the invention, said actuating mechanism comprises a generally rectangular cam member 42 arranged between the free or end portions of the two release levers 38 and mounted on a stub shaft 43 journalled in registering apertures 44 (Fig. 5) in the two latch bolt members. For the mounting of the cam member 42 on the stub shaft 43, so that the two turn together or in unison, the stub shaft here shown is formed with a non-circular intermediate section and the cam member is provided with a non-circular aperture 45 (Fig. 5) to receive such shaft section. The shaft journalling aperture 44 in the bolt member which is next to the door edge wall 13, is, of course, of enlarged size, as shown in Fig. 5, to permit the non-circular shaft section to be passed therethrough and the shaft forwardly of its non-circular section is of a size (greater than that of its rear end portion) for proper bearing support in such enlarged aperture 44. Normally, of course, the cam member 42 is in its non-actuated, generally horizontal position, as in Fig. 6, with the bolt release levers 38 lying more or less alongside the cam member and in spaced relation with respect to the bolt teeth 28.

Figure 12:
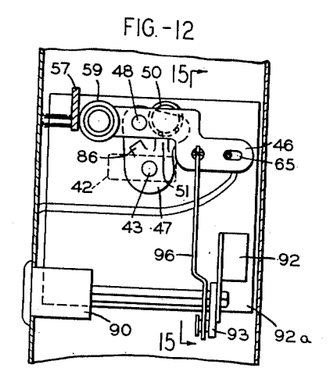
Fig. 12 is a transverse elevational view, on the line 12—12 of Fig. 1, of the actuating mechanism for the latch bolt release means, the actuating mechanism being in the position which it occupies when the door is closed.
Figure 13:
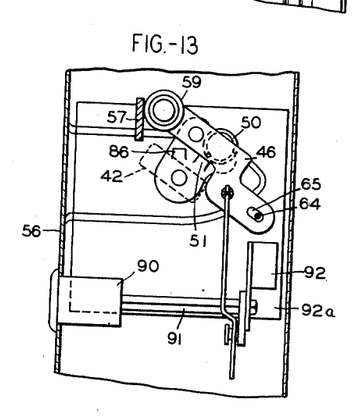
Fig. 13 is a view similar to to Fig. 12 but showing said actuating mechanism in its actuated position, as the result of operation of either the inside or the outside operating means, for release of the latch bolt from detention by the keeper jaws.
Figures 14, 15:
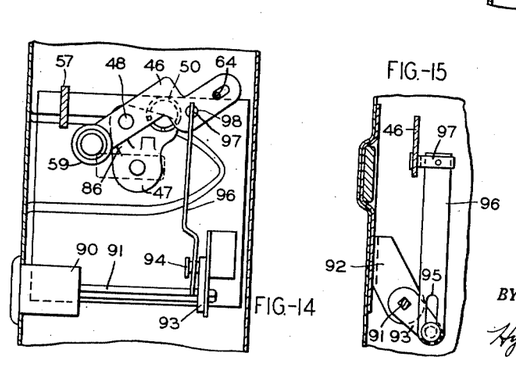
Fig. 14 is a view similar to Figs. 12 and 13, but showing said actuating mechanism in the position which it occupies when it is desired to prevent the release of the latch bolt by operation of the outside operating means.
Fig. 15 is a vertical sectional view, on the line 15—15 of Fig. 12, and showing the parts which are operated by an outside key lock to prevent release of the latch bolt by operation of the outside operating means, the lock parts being in their normal non-locking position.
Figure 16:
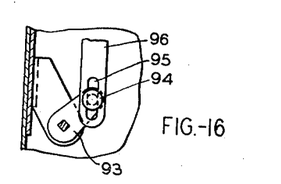
Fig. 16 is a fragmentary view, similar to Fig. 15, but showing said lock parts in their locking position.

The actuating means for the latch bolt release levers 38 further comprises a lever 46 and a support 47 therefor on the interior side of the door edge wall 13, the lever support being fixedly mounted on the front end of the stub shaft 43 which projects forwardly through said door edge wall, as shown in Fig. 10. As shown in Figs. 12, 13 and 14, the lever 46 extends across, and is pivotally connected by a pin 48 to, the upper end portion of its support 47. When the door 10 is unlocked, the lock for the door being hereinafter described, the lever 46 is releasably held in a position at right angles to the longitudinal axis of its support, a relationship which is shown in Figs. 12 and 13. This relationship of the lever and its support is here effected by the use of an over-center spring 50, having one of its ends secured to the lever and its other end secured to the lever support, and which normally maintains the lever, inwardly of its pivot 48, in seating engagement upon an abutment 51, such as a pressed out lug, with which the lever support is provided.

Inasmuch as the angular position of the lever support is controlled by the lever 46, and inasmuch as the lever support is fixedly mounted on the stub shaft 43 with which the cam member 42 turns, the angular position of said cam member is controlled by the lever 46. When the door 10 is closed and latched but not locked, the lever 46 extends horizontally across its now upright support, as in Fig. 12. To actuate the cam member 42 to swing the latch bolt release levers 38 divergently for release of the latch bolt from the keeper jaws, the lever 46 is moved to the inclined position shown in Fig. 13, with resultant movement of the cam member 42 to its lever actuating position shown in Fig. 13 and in Figs. 7 and 8.

To effect such bolt releasing movement of the lever 46, two operating means are provided, namely, an outside operating means and an inside operating means, to thereby enable the latch bolt to be released from retention by the keeper jaws and the door 10 opened by a person outside or inside the automobile of which the door is a part.

Although the outside door operating means may be of any suitable form, such as a push button operating means, the outside operating means here shown comprises a pull handle 54 pivotally mounted at 55 in any suitable manner on the outer side wall 56 of the door 10. As shown in Fig. 1, said handle is here provided at its pivoted end with an operating arm 57 extending into the door for operative engagement with the outer end of the lever 46 of the bolt release means actuating mechanism, said lever being provided at its outer end, in the embodiment of the invention here shown, with a roller 59 for engagement by said handle arm 57.

As will be readily understood, upon outward movement of the free end portion of the handle 54, its operating arm 57 will be moved inwardly for movement of the lever 46 to its Fig. 13 position, with consequent actuation of the cam member 42 and the resulting divergent movement of the release levers 38 into positions to free the door latch bolt from its latching retention by the keeper jaws.

The inside operating means, for the movement of the lever 46 to its bolt-releasing Fig. 13 position, also may be of any suitable form, although it preferably is of the so called "remote control" type. As here shown (see Fig. 11 and also Fig. 1), said inside operating means includes a strap 61 having its rear end pivotally mounted, as at 62, on the inner side wall 63 of the door 10, the strap pivot being at a distance remote from the door edge wall 13. The front end of said strap is operatively connected to the inner end portion of the lever 46, an operative connection which is here effected by providing said strap at its front end with a forwardly projecting pin-like element 64 and the inner end portion of said lever with a slot 65 to receive said projecting pin-like element.

To swing the strap 61 downwardly about its pivot 62, with the downward movement of the pin-like element 64 at the front end of said strap thereby effecting movement of the lever 46 to its Fig. 13 position, a stub shaft 67 is suitably journalled in the inner side wall 63 of the door 10, above and adjacent the strap pivot 62, and to said shaft is fixedly secured a depending arm 68 having a yoke 69 in straddling engagement with a roller 70 carried by the strap forwardly of its pivot. To the shaft 67 also is fixedly secured, on the inner side of the door 10, a suitable handle (not here shown) for manually turning the shaft in a clockwise direction (Fig. 11) to thereby cause downward swinging movement of the strap 61, the strap movement being limited, and the strap being held alongside the inner side wall of the door 10, by a suitable bracket 71 with which said side wall is provided.

Thus, by either an outward pull on the outside door handle 54 or by clockwise rotation (Fig. 11) of the inside door handle shaft 67, the lever 46 may be moved to its Fig. 13 position, to thereby effect release of the door latch bolt from its latching retention by the keeper jaws, all as will be readily understood.

In automobile door latches now in use, means is provided at the inside of the door for rendering, when desired, the outside door actuator incapable of effecting release of the latch and hence opening of the door, and in the present latch device, such an inside door locking means also is provided.

Figure 11:
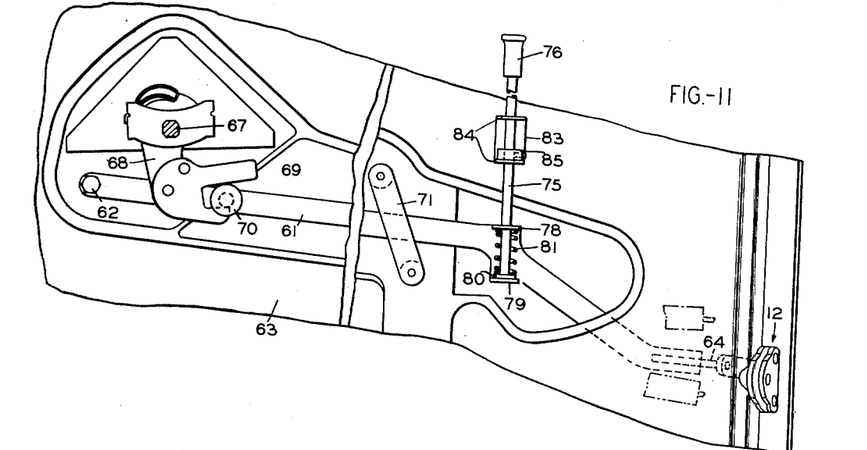
Fig. 11 is a longitudinal elevational view of the inside operating means for the actuating mechanism for the latch bolt release means.

As shown in Fig. 11, the strap 61 of the inside door operating means has operatively connected thereto the lower end portion of a push-pull rod 75 extending upwardly through the garnish molding (not shown) at the bottom of the window opening (not shown) with which the door 10 is provided, the push-pull rod being provided at its upper exposed end with a suitable operating knob 76.

For the operative connection of the strap 61 and the lower end portion of the push-pull rod 75, said strap is here provided on its upper and lower edges with a pair of inwardly extending aligned ears 78 and 79, the upper ear 78 being apertured to slidably receive the push-pull rod, as shown in Fig. 11. At its lower end, the push-pull rod 75 is provided with an abutment disc 80 which is normally maintained in seating engagement upon the lower strap ear 79 by a coiled compression spring 81, which surrounds the lower end portion of the push-pull rod and which is confined between the rod abutment disc 80 and the upper strap ear 78.

To limit the extent to which the strap 61 can be swung upwardly and downwardly by the push-pull rod 75, there is here secured to the inner side wall 63 of the door 10 a bracket 83 having inwardly extending top and bottom flanges 84, said flanges being apertured to slidably receive the push-pull rod and said rod having adjustably secured thereto, between said bracket flanges, a collar 85.

When it is desired to render the outside door handle 54 incapable of effecting release of the latch bolt from its retention by the keeper jaws and thus incapable of effecting opening movement of the door 10, it is merely necessary for one inside the automobile to grasp the knob 76 of the push-pull rod 75 and to pull said rod upwardly, to thereby effect corresponding upward movement of the strap 61 of the inside operating means. This upward movement of the strap 61 causes the pin-like element 64 at its front end to swing the lever 46 of the bolt release actuating mechanism to the position shown in Fig. 14, the lever moving about its pivot 48 on its support 47 to a new relationship with respect to such support. As shown in Fig. 14, this relationship is one in which the lever 46 is inclined with respect to the longitudinal axis of its support 47, with the lever forwardly of its pivot seating against a second abutment, such as a struck up lug 86, on the lever support, and with such relationship being releasably maintained by the over-center spring 50.

As shown in Fig. 14, when the lever 46 is in its Fig. 14 position, as the result of upward movement of the inside push-pull rod 75, the roller 59 at the outer end of said lever is below the horizontal path of movement of the arm 57 of the outside door handle 54. Therefore, although said handle can be operated to produce movement of its arm 57, such arm is now incapable of moving the lever 46 and hence, incapable of now effecting actuation of the cam member 42 for bolt release movement of the release levers 38.

To again render the outside handle 54 effective, upon operation thereof, to bring about release of the latch bolt and opening of the door 10, it merely is necessary to move the push-pull rod 75 downwardly, to thereby return the front end of the strap 61 to its normal position (its full line position, Fig. 11) and to return the lever 46 to its Fig. 12 position, a position in which the lever roller 59 is again in the path of movement of the handle arm 57.

As is customary in automobile door latches, the presene latch device also includes an outside key-actuated lock to prevent the outside door handle 54 from effecting release of the latch bolt and hence, opening of the door 10.

As shown in Figs. 12 to 16 inclusive, a key-actuated lock cylinder 90 is suitably mounted in the outer side wall 56 of the door 10, adjacent its edge wall 13. Extending inwardly from said lock cylinder is a key controlled spindle 91, the inner end of which is journalled in a bracket 92 suitably secured to a latch plate 92a which in turn is suitably secured to the interior surface of the door edge wall 13. Fixedly mounted on said spindle is one end of an arm 93 which is provided at its free end with a pin 94 extending through and movable in a slot 95 in the lower end portion of a link 96, the upper end of which is operatively connected to the inner end portion of the lever 46. Although the operative connection of the link 96 and the lever 46 may be of any suitable form, it here is effected by providing the upper end of said link with a forwardly projecting pin-like element 97 and the inner end portion of said lever with a suitable aperture 98 to receive such pin-like element. Due to the lost motion connection of the spindle arm 93 to the link 96, said spindle arm is not affected by movement of the lever 46 between its Fig. 13 and Fig. 14 positions as the result of the operation of the inside door handle or actuator.

When it is desired to lock the door 10 from the outside thereof (the lever 46 being in its Fig. 12 position when the door is closed and latched), the lock spindle 91 is turned by key operation in a counter-clockwise direction (Figs. 15 and 16 and as viewed from the left in Figs. 12, 13 and 14), to thereby cause the spindle arm 93 to elevate the link 96 and hence, to elevate the inner end portion of the lever 46, the lever thus being moved to its Fig. 14 position, with consequent location of its roller 59 out of the path of movement of the arm 57 of the outside door handle 54. To unlock the door by key operation, it merely is necessary, of course, to turn the lock spindle 91 in the reverse or clockwise direction, to thereby lower the link 96 and return the lever 46 to its Fig. 12 position, with the lever roller 59 thus being returned to its normal position in the path of movement of the arm 57 of the outside handle 54. However, key-locking of the door from the outside does not prevent release of the latch bolt and opening of the door from the inside, as the lever 46 can be moved from its Fig. 14 position to its Fig. 13 position by operation of the inside door handle or actuator, even when the door is key-locked from the outside.

Referring now to the latch device of Figs. 17 to 23 inclusive, which constitutes a second embodiment of the present invention, it will be noted that said latch device includes a latch bolt and cooperating keeper jaws of substantially the same character as those of the latch device of Figs. 1 to 16 inclusive. However, in this second latch device, the outer end portions of the keeper jaws 17a are so formed as to cause them to laterally interlock with the latch bolt members 18a and 19a, upon the movement of the door 10a to closed position, and thus materially aid in the support and retention of the door in the plane thereof. As here shown (Figs. 17, 18 and 21), the contiguous or adjacent surfaces of the outer end portions of the jaw bodies 30a and their surrounding casings or rim members 34a are of concave form in cross section (see Fig. 21) to receive in straddling relationship the upper and lower outer side edge portions 25a of the latch bolt members 18a and 19a, bolt edge portions which are spaced from the plane of the door edge wall 13a by the offset portion 23a thereof and to which offset portion said bolt members are secured. There is thus provided an effective lateral interlock of the keeper jaws and the latch bolt members when the door 10a is closed, an interlock which is of material value in holding the door against movement in the plane thereof. As will be evident from Figs. 17 and 18, the contiguous or adjacent surfaces of the outer end portions of the surrounding casings or rim members 34a are of generally arcuate form in longitudinal section, with the centers of said arcuate portions being the jaw supporting studs 31a. Thus, the door-supporting relationship which exists between the outer end portions of the keeper jaws and the adjacent portions of the latch bolt members is one which does not interfere with the latching cooperation of the jaws and the latch bolt members, moreover, by reason of the rubber or rubber-like bodies of the keeper jaws, the door supporting relationship provided by the present latch device is one in which the door is cushioned in rubber, so that there is no shock or noise transmission due to metal-to-metal contact between the door and its supporting structure, insofar as the latch device is concerned.

Figure 17:
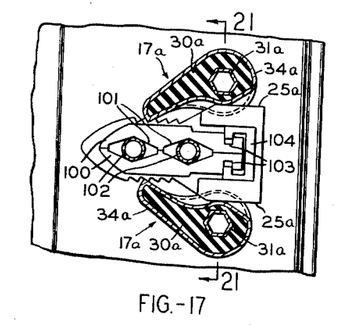
Fig. 17 is a view corresponding to Fig. 6 but relating to a slightly modified form of latch device embodying the present invention, the view being a vertical sectional view, showing the retention of the latch bolt by its co-operating keeper for the retention of an automobile door in a closed position.
Figure 18:
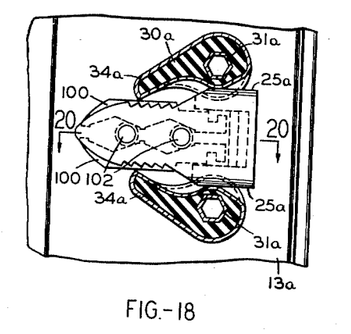
Fig. 18 is a view corresponding to Fig. 17 but showing the latch bolt released from its retention by said keeper, the door still being in such closed position.
Figure 19:
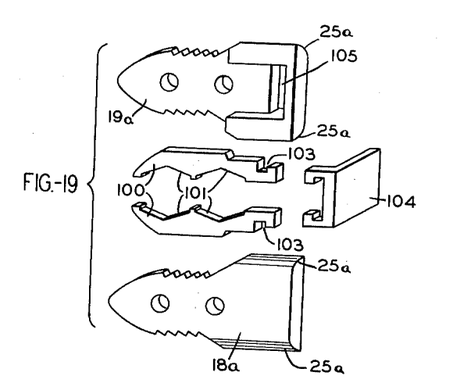
Fig. 19 is a perspective view of the latch bolt members and the release means therefor, the parts being in spaced or separated relationship.
Figure 20:
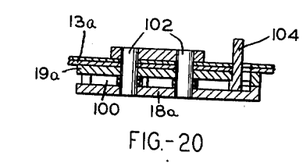
Fig. 20 is a horizontal detail sectional view on the line 20—20 of Fig. 18.
Figure 21:
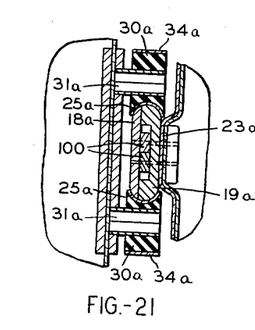
Fig. 21 is a transverse vertical sectional view on the line 21—21 of Fig. 17.

Moreover, instead of pivoted levers for the release of the latch bolt from retention by the keeper jaws, the latch bolt members 18a and 19a of this second latch device have arranged therebetween release members in the form of upper and lower cam slides 100. As shown in Figs. 17, 18 and 19, the two slides are provided on their adjacent side edges with two sets of complementary cam-forming notches of V-shape, the two sets of V-shaped cams 101 thus formed cooperating with stud-like elements 102 secured to the door edge wall 13a and extending through the bolt members and between the slides for effecting, upon inward or outward movement of the slides, concurrent divergent or convergent movement thereof.

To move the two release slides inwardly and outwardly, any suitable means may be utilized. As here shown, the slides are provided in the outer end portions of their upper and lower edge walls with notches 103 for the interlocking securement thereto of an actuator 104, here shown as a strip-like member disposed at right angles to the plane of the slides and projecting into the door 10a through a suitable slot 105 here provided in the outer end of the forward bolt member 19a.

As shown in Fig. 17, when the door 10a is closed and latched, the release slides 100 are in their normal outward or withdrawn positions, in spaced relation to the bolt ratchet teeth. Although the actuator 104 for the release slides 100 may be moved inwardly or outwardly to release the latch bolt members from their latching retention by the keeper jaws, the actuator 104 is here moved inwardly for such purpose, by operation of the means hereinafter described, with corresponding inward or advancing movement of the slides. As the result of the engagement of the slide cams 101 with the stud-like elements 102 therebetween, the slides move divergently as well as inwardly, to thereby forcibly move the keeper jaws from their latching retention with the latch bolt teeth, as shown in Fig. 18, and thus enable the door 10a to be opened. Upon the closing of the door, the release slides 100 are automatically returned to their normal withdrawn positions by the engagement therewith of the keeper jaws, as will be readily understood.

For the operation of the slide actuator 104, means are provided at both the inside and outside of the door 10a, with such inside and outside operating means being of any suitable form.

Figure 22:
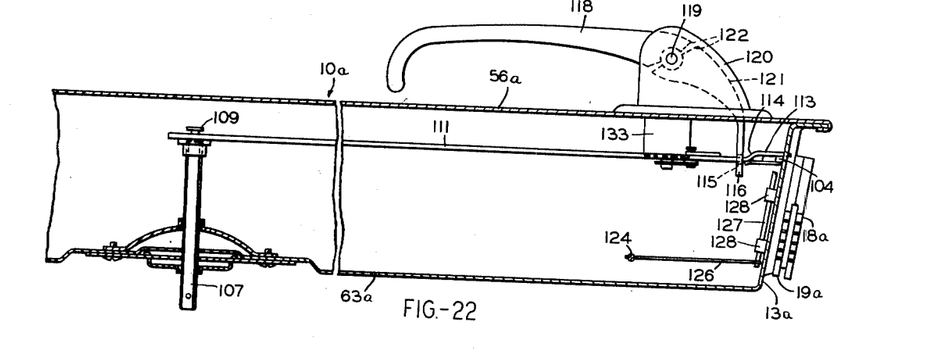
Fig. 22 is a view corresponding to Fig. 1 but relating to the latch device embodying this second form of the invention, the view being a horizontal sectional view through the automobile door with which the latch device is used.
Figure 23:
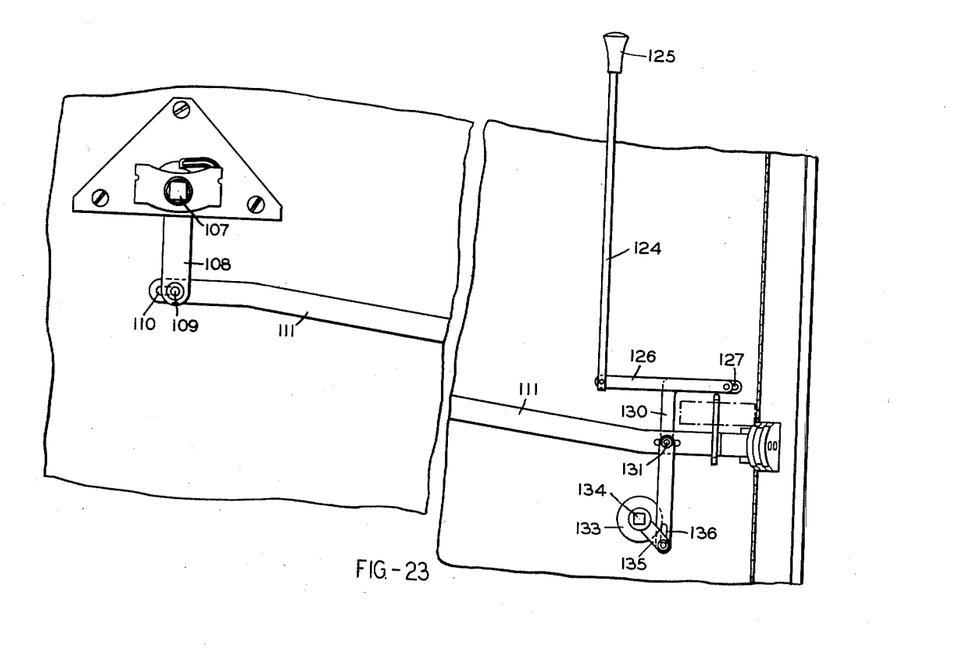
Fig. 23 is a vertical view, showing the inside operating means of this second form of latch device.

In this second form of latch device, the inside operating means for the slide actuator 104 includes a shaft 107 suitably journalled in the inner side wall 63a of the door 10a, the inner end portion of said shaft being disposed inwardly of the door for the reception of a suitable operating handle or the like (not here shown). Fixedly secured to the outer end of the shaft 107, within the door 10a, is a depending arm 108 provided at its lower end with a pin 109 extending through and movable in a slot 110 in the rear end portion of a strap 111, the front end of which is disposed adjacent the door edge wall 13a. As shown in Fig. 22 the front end portion 113 of the strap 111 is outwardly offset with respect to the major portion of the strap to thereby provide a cam-forming shoulder 114, with the offset front end portion 113 of the strap being disposed outwardly of the slide actuator 104 and normally in horizontal alignment therewith, as shown in Figs. 22 and 23. As further shown in Figs. 22 and 23, the strap 111, rearwardly of its cam-forming shoulder 114, extends through a slot 115 in an arm 116 extending into the door 10a from the door outer side wall 56a, the arm 116 being a part of the outside operating handle hereinafter referred to.

For inward movement of the slide actuator 104 by actuation of the inside operating means, for release of the door latch bolt from its latching retention by the keeper jaws, the shaft 107 on the inner side wall 63a of the door is turned by its handle (not shown) in a clockwise direction, Fig. 23, to withdraw or move rearwardly the strap 111. As the result of the engagement of the cam-forming shoulder 114 of the strap with the handle arm 116, said arm is moved inwardly, with corresponding inward movement as well as rearward movement of the front end portion 113 of the strap. The inward movement of the strap front end portion 113 effects, of course, by its engagement with the slide actuator 104, inward and divergent movement of the slides 100, and thus effects release of the latch bolt from retention by the keeper jaws for opening movement of the door 10a.

The outside operating means for effecting inward movement of the slide actuator 104 here comprises a two part handle, the manipulating handle part 118 being pivotally mounted at its forward end on a pin 119 in a bracket 120 suitably secured to the door outer side wall 56a adjacent the door edge wall 13a, and the handle part 121, of which the inwardly extending slotted arm 116 is an integral portion, being pivotally mounted at its rear end on the bracket pivot pin 119.

As shown in Fig. 22, the two handle parts are provided at their pivoted ends with opposed shoulders 122, so that upon outward pulling movement of the manipulating handle part 118, the other handle part 121 is caused to move inwardly. Inasmuch as the strap 111 of the inside operating means extends through the slot 115 in the arm 116 of the handle part 121, the front end portion 113 of said strap is correspondingly moved inwardly, to thereby produce bolt release movement of the slide actuator 104, as before.

Due to the two part character of the outside door handle, its manipulating handle part 118 is not moved by movement of the strap 111 as the result of actuation of the inside operating means. Although the handle part 121 is moved when the inside operating means is operated, such handle part is concealed by the handle mounting bracket 120, and thus the movement of this handle part cannot be seen.

As in the latch device of Figs. 1 to 16 inclusive, the second form of the present latch device also includes inside means for preventing, when desired, release of the latch bolt by operation of the outside door handle.

As here shown, such means includes a push-pull rod 124 extending upwardly through the garnish molding (not shown) of the door 10a at the base of the window opening (not shown) in said door, with an operating knob 125 on the exposed upper end of said rod. Pivotally secured to the lower end of said rod (see Fig. 23) is a forwardly projecting link 126 having its front end rigidly mounted on the inner end of a shaft 127 extending across the interior surface of the door edge wall 13a and journalled in suitable brackets 128 carried by said door edge wall. Rigidly mounted on the outer end of said transverse shaft 127 is the forward end of a bell-crank lever 130, the depending arm of which is provided with a pin 131 extending through an elongated slot in the strap 111 of the inside operating means for the pivotal connection of the lever arm to said strap.

As will be evident from Fig. 23, when the push-pull rod 124 is moved upwardly, the link 126 secured thereto will turn the transverse shaft 127 in a clockwise direction, Fig. 23, with consequent upward swinging movement of the bell-crank lever 130 and elevation of the front end portion 113 of the strap 111 to a position (the dotted line position in Fig. 23) in which such strap portion 113 is out of horizontal operating alignment with the slide actuator 104. Thus, when the push-pull rod 124 is in its elevated position, the outside door handle is incapable of effecting inward bolt-release movement of the slide actuator 104, as such actuator is, of course, below the path of movement of the now elevated strap front end portion 113 which is moved inwardly upon operation of the outside door handle. To enable the outside door handle to again effect, upon operation thereof, the release of the latch bolt from its retention by the keeper jaws, it merely is necessary to restore the push-pull rod 124 to its normal lowered position, which through the link 126, transverse shaft 127 and bell-crank lever 130, will return the front end portion 113 of the strap 111 to its normal position in operating alignment with the slide actuator 104.

As in the latch device of Figs. 1 to 16 inclusive, the latch device constituting this second embodiment of the invention includes an outside key-actuated lock for preventing release of the latch bolt and hence, opening of the door 10a, by operation of the outside door handle.

As shown in Fig. 23, a cylinder lock 133 is suitably mounted in the outer side wall 56a of the door 10a, adjacent the door edge wall 13a, with said cylinder lock being provided with an inwardly extending key-controlled spindle 134. Rigidly mounted on the inner end of said spindle is one end of an arm 135, the free end of which has a lost motion connection at 136 to the lower end of the depending arm of the bell-crank lever 130.

To lock the door 10a from the outside, the lock spindle 134 is key-turned in a clockwise direction, Fig. 23, with corresponding movement of the spindle arm 135 and upward swinging movement of the bell-crank lever 130. Inasmuch as the strap 111 of the inside operating means is pivotally connected to the depending arm of said bell-crank lever, the front end portion 113 of said strap is elevated to its dotted line position, Fig. 23, and thus put out of horizontal operating alignment with the slide actuator 104. To unlock the door from the outside, the key-controlled lock spindle 134 is merely turned in the reverse or counter-clockwise direction, with return of the strap front end portion 113 to its normal position, in horizontal operating alignment with the slide actuator, as will be readily understood.

Although use thereof is not considered essential, either or both of the keeper jaws of latch devices embodying the present invention, such as the automobile door latch devices of Figs. 1 to 23 inclusive, may be provided with a "safety catch" for cooperation with the latch bolt ratchet teeth in preventing accidental release of the latch bolt and hence, accidental opening of the door on which the latch bolt is mounted, should the keeper jaws fail for any reason, such as the result of the subjection of their rubber or rubber-like bodies 30 to abnormal temperatures, to perform their bolt retaining latching function.

In Figs. 24 to 28 inclusive, there is illustrated a pair of keeper jaws 17b of the character of those previously described and for cooperation with a door latch bolt having release slides of the character utilized in the latch device of Figs. 17 to 23 inclusive, the keeper jaws being provided with one form of such safety catches.

As here shown, each of the keeper jaws 17b has pivotally connected, at 140, to the outer surface of its tooth-like projection 35b, the inner end of an outwardly extending hook-like catch member 141, with the hook 142 at the outer end of said catch member extending toward the space occupied by the door latch bolt when the door is closed for cooperation with the bolt ratchet teeth. To maintain the hooked end of the catch member in proper relationship with respect to its associated keeper jaw, the hooked end of the catch member is connected to and supported by the enlarged outer end of said keeper jaw, a connection which is here effected by embedding one end of a leaf spring 143 in the hooked end of the catch member and the other end of said leaf spring in the enlarged outer end of the keeper jaw.

Figure 24:
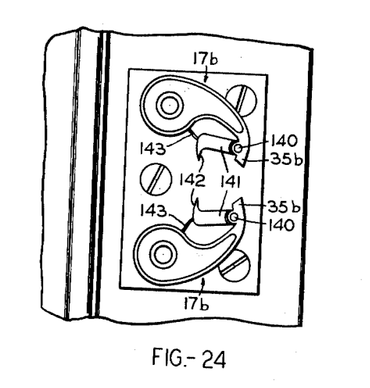
Fig. 24 is an outside elevational view of a keeper structure, of the character of that used in the two latch devices of Figs. 1 to 23 inclusive, but with the keeper jaws having associated therewith "safety catch" means for the door latch bolt.
Figure 25:
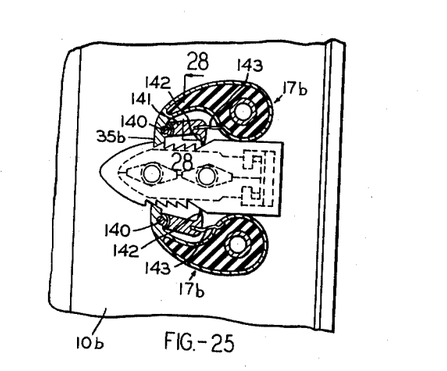
Fig. 25 is a vertical sectional view, showing the position of the safety catch means when the keeper jaws are retainably engaged with a latch bolt for door latching purposes.
Figure 26:
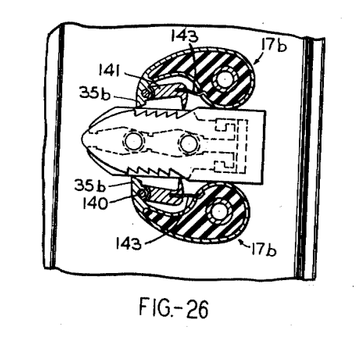
Fig. 26 is a similar view, showing the position of the safety catch means when the latch bolt release means has been actuated to free the latch bolt from retention by the keeper jaws.
Figure 27:
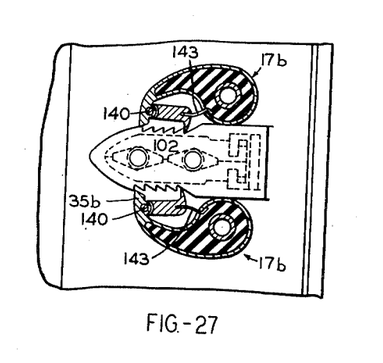
Fig. 27 is a similar view, showing the manner in which the safety catch means functions to prevent accidental release of the latch bolt and hence opening of the door in the event that the keeper jaws fail or are unable to perform that function.
Figure 28:
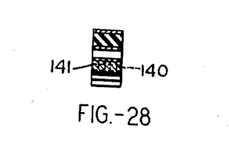
Fig. 28 is a detail cross-sectional view on the line 28—28 of Fig. 25.

In Fig. 24 is shown the positions of the safety catch members of the two keeper jaws when the door 10b is open, the members being held in substantially parallel relationship by their leaf springs 143; in Fig. 25 is shown the positions of the safety catch members when the door 10b is closed and locked, the hooks 102 of said members being ready for use in preventing release of the door latch bolt should the keeper jaw projections fail in their bolt retaining functions; in Fig. 26 is shown the positions of the safety catch members when the release slides associated with the latch bolt have been moved inwardly and divergently to free the latch bolt from retention by the keeper jaw projections for door unlatching purposes, the hooks 142 of the safety catch members, like the jaw projections 35b, having been moved by said release slides into positions in spaced relation to the bolt ratchet teeth; and in Fig. 27 is shown the manner in which the hooks 142 of the safety catch members cooperate with the latch bolt ratchet teeth to prevent release of the latch bolt, and opening of the door, upon failure of the keeper jaws to perform such function.

Thus, should the keeper jaws fail, for any reason, to properly cooperate with the door latch bolt in the retention of the door in closed position, the safety catch members associated with said keeper jaws will automatically come into use, and by their retaining engagement with the latch bolt teeth, prevent release of the latch bolt and hence, opening of the door.

From the foregoing description of two automobile door latch devices, and of safety catches for the keeper jaws thereof, it will be quite evident that devices embodying the present invention have many features and advantages and constitute a definite advance in the latch art. Although latch devices for automobile doors have been here illustrated and described, it will be quite apparent that devices embodying the present invention may be used with other closures, such as the hoods and the deck lids of automobiles and the like, or with closures which are slidably, rather than swingably, moved to closed positions. Or devices embodying the present invention may be used with relatively movable members, of which neither is a closure, for the releasable retention or the detachable connection of said members in particular relationships.

What is claimed is:

1. A device for releasably retaining two relatively movable members in a particular relationship, said device comprising retainable means for immovable association with one of said members, retaining means for association with the other of said members and comprising an elastic deformable rubber body and a rigid support therefor to which said body is anchored, said rubber body being put under torsional stress by said retainable means upon the relative movement of said members into said particular relationship and said retaining means having retaining engagement with said retainable means as the result of such torsional stress of its rubber body, with the consequent retention of said members in said relationship, and means for releasing said retainable means from its retention by said retaining means to thereby release said members from their retention in said relationship.

2. A device for releasably retaining two relatively movable members in a particular relationship, said device comprising retainable means for immovable association with one of said members, retaining means for association with the other of said members and comprising an elastic deformable rubber body and a rigid support therefor to which said body is bonded, said rubber body being put under torsional stress by said retainable means upon the relative movement of said members into said particular relationship, and said retaining means having retaining engagement with said retainable means as the result of such torsional stress of its rubber body, with the consequent retention of said members in said relationship, and means having a remotely located manually actuable part for releasing said retainable means from its retention by said retaining means to thereby release said members from their retention in said relationship.

3. A device for releasably retaining two relatively movable members in a particular relationship, said device comprising retainable means for immovable association with one of said members and provided with an abutment, retaining means for association with the other of said members and comprising an elastic deformable rubber body, a rigid support therefor to which said body is anchored, and a rigid projection anchored to said body, said body being put under torsional stress by said retainable means upon the relative movement of said members into said particular relationship, and the projection of said retaining means having retaining engagement with the abutment of said retainable means as the result of such torsional stress of its rubber body, with the consequent retention of said members in said relationship, and means for releasing the abutment of said retainable means from retention by the projection of said retaining means to thereby release said members from their retention in said relationship.

4. A device for releasably retaining two relatively movable members in a particular relationship, said device comprising retainable means for immovable association with one of said members and provided with an abutment, retaining means for association with the other of said members and comprising an elastic deformable rubber body, a rigid support therefor to which said body is anchored, and a casing surrounding the periphery of said body and anchored thereto, said body being put under torsional stress by said retainable means upon the relative movement of said members into said particular relationship and the casing surrounding and bonded to said body being provided with a projection having retaining engagement with the abutment of said retainable means as the result of such torsional stress of said rubber body, with the consequent retention of said members in said relationship, and means for releasing the abutment of said retainable means from retention by the projection of said retaining means to thereby release said members from their retention in said relationship.

5. A device for releasably retaining two relatively movable members in a particular relationship, said device comprising retainable means for immovable association with one of said members and provided with an abutment, retaining means for association with the other of said members and comprising an elongated elastic deformable rubber body, a rigid stud-like support on which one end portion of said body is anchored, and a rigid projection anchored to the other end portion of said body, said body being put under torsional stress by said retainable means upon the relative movement of said members into said particular relationship, and the projection of said retaining means having retaining engagement with the abutment of said retainable means as the result of such torsional stress of its rubber body, with the consequent retention of said members in said relationship, and means for releasing the abutment of said retainable means from retention by the projection of said retaining means to thereby release said members from their retention in said relationship.

6. A device for releasably retaining two relatively movable members in a particular relationship, said device comprising retainable means for immovable association with one of said members and provided with an abutment, retaining means for association with the other of said members and comprising an elongated elastic deformable rubber body, a rigid stud-like support on which one end portion of said body is anchored, and a casing surrounding the periphery of said body and anchored thereto, said body being put under torsional stress by said retainable means upon the relative movement of said members into said particular relationship and the casing surrounding and bonded to said body being provided with a projection having retaining engagement with the abutment of said retainable means as the result of such torsional stress of said rubber body, with the consequent retention of said members in said relationship, and means for releasing the abutment of said retainable means from retention by the projection of said retaining means to thereby release said members from their retention in said relationship.

7. A device for releasably retaining two relatively movable members in a particular relationship, said device comprising retainable means for immovable association with one of said members, retaining means for association with the other of said members and comprising an elastic deformable rubber body and a rigid support therefor to which said body is anchored, said rubber body being put under torsional stress by said retainable means upon the relative movement of said members into said particular relationship and said retaining means having retaining engagement with said retainable means as the result of such torsional stress of its rubber body, with the consequent retention of said members in said relationship, and means pivotally associated with said retainable means for effecting its release from retention by said retaining means to thereby release said members from their retention in said relationship.

8. A device for releasably retaining two relatively movable members in a particular relationship, said device comprising retainable means for immovable association with one of said members, retaining means for association with the other of said members and comprising an elastic deformable rubber body and a rigid support therefor to which said body is anchored, said rubber body being put under torsional stress by said retainable means upon the relative movement of said members into said particular relationship and said retaining means having retaining engagement with said retainable means as the result of such torsional stress of its rubber body, with the consequent retention of said members in said relationship, and means slidably associated with said retainable means for effecting its release from retention by said retaining means to thereby release said members from their retention in said relationship.

9. A device for releasably retaining two relatively movable members in a particular relationship, said device comprising retainable means for immovable association with one of said members and provided with spaced abutments, retaining means for association with the other of said members and comprising an elastic deformable rubber body, a rigid support therefor to which said body is anchored, and a rigid projection anchored to said body, said body being put under torsional stress by said retainable means upon the relative movement of said members into said particular relationship and the projection of said retaining means having successive retaining engagement with the abutments of said retainable means as the result of such torsional stress of said rubber body, with the consequent retention of said members in said relationship, and means for moving the projection of said retaining means out of retaining engagement with the abutment of said retainable means then being engaged by said projection to release said members from their retention in said relationship, and to maintain said projection out of retaining engagement with the abutments of said retaining means during relative movement of said members out of such relationship.

10. A device for releasably retaining two relatively movable members in a particular relationship, said device comprising retainable means for immovable association with one of said members and provided with spaced abutments, retaining means for association with the other of said members and comprising an elastic deformable rubber body, a rigid support therefor to which said body is anchored, and a rigid projection anchored to said body, said body being put under torsional stress by said retainable means upon the relative movement of said members into said particular relationship and the projection of said retaining means having successive retaining engagement with the abutments of said retainable means as the result of such torsional stress of said rubber body, with the consequent retention of said members in said relationship, and means including a part movable outwardly to a blocking position with respect to the abutments of said retaining means, to thereby disengage the projection of said retainable means from retaining engagement with the abutment then being engaged by it, with consequent release of said members from their retention in said relationship, and to prevent retaining engagement of said projection with said abutments of the retainable means during relative movement of said members out of such relationship.

11. A device for releasably retaining two relatively movable members in a particular relationship, said device comprising retainable means for immovable association with one of said members and provided with a set of ratchet teeth, retaining means for association with the other of said members and comprising an elastic deformable rubber body, a rigid support therefor to which said body is anchored, and a rigid projection anchored to said body, said body being put under torsional stress by said retainable means upon the relative movement of said members into said particular relationship and said projection having successive retaining engagement with the ratchet teeth of said retainable means, as the result of such torsional stress of said body, during the relative movement of said members into said relationship, with the consequent retention of said members in said relationship, and means having a part movable outwardly to at least the outer edges of the ratchet teeth of said retainable means, to thereby release the retainable means from retention by the projection of said retaining means and to release said members from their retention in such relationship, and to prevent retaining engagement of said projection with the ratchet teeth of said retainable means during relative movement of said members out of such relationship.

12. A device for releasably retaining two relatively movable members in a particular relationship, said device comprising retainable means for immovable association with one of said members and provided with a set of ratchet teeth, retaining means for association with the other of said members and comprising an elastic deformable rubber body, a rigid support therefor to which said body is anchored, and a rigid projection anchored to said body, said body being put under torsional stress by said retainable means upon the relative movement of said members into said particular relationship and said projection having successive retaining engagement with the ratchet teeth of said retainable means, as the result of such torsional stress of said body, during the relative movement of said members into said relationship, with the consequent retention of said members in said relationship, and means having a cam-operated part movable outwardly to at least the outer edges of the ratchet teeth of said retainable means, to thereby release the retainable means from retention by the projection of said retaining means and to release said members from their retention in such relationship, and to prevent retaining engagement of said projection with the ratchet teeth of said retainable means during relative movement of said members out of such relationship.

13. A device for releasably retaining two relatively movable members in a particular relationship, said device comprising retainable means for immovable association with one of said members and having two laterally spaced portions of which at least one is provided with an abutment, retaining means for association with the other of said members and comprising an elastic deformable rubber body which is put under torsional stress by said retainable means upon the relative movement of said members into said particular relationship, said body having a projection retainably engaging the abutment of said retainable means, as the result of such torsional stress of said body, upon the relative movement of said members into said relationship, with the consequent retention of said members in such relationship, and means arranged between the laterally spaced portions of said retainable means for releasing the abutment of said retainable means from retention by the projection of said retaining means to thereby release said members from their retention in said relationship.

14. A device for releasably retaining two relatively movable members in a particular relationship, said device comprising retainable means for immovable association with one of said members and having two laterally spaced portions provided with laterally aligned abutments, retaining means for association with the other of said members and comprising an elastic deformable rubber body which is put under torsional stress by said retainable means upon the relative movement of said members into said particular relationship, said body having a projection retainably engaging the abutments upon both of the laterally spaced portions of said retainable means, as the result of such torsional stress of said body, upon the relative movement of said members into said relationship, with the consequent retention of said members in such relationship, and means arranged between the laterally spaced portions of said retainable means for releasing the abutments of said retainable means from retention by the projection of said retaining means to thereby release said members from their retention in such relationship.

15. A device for releasably retaining two relatively movable members in a particular relationship, said device comprising retainable means for immovable association with one of said members and having two laterally spaced portions each provided with a set of ratchet teeth, retaining means for association with the other of said members and comprising an elongated elastic deformable rubber body, a rigid stud-like support therefor on which one end portion of said body is bonded, and a casing surrounding the periphery of said body and bonded thereto, said casing being provided with a projection at the other end portion of said body for cooperation with both sets of ratchet teeth on said retainable means, said body being put under torsional stress by said retainable means upon the relative movement of said members into said particular relationship and the projection of said casing having retaining engagement with ratchet teeth on both said laterally spaced portions of said retainable means, as the result of such torsional stress of said body, upon the relative movement of said members into said relationship, with the consequent retention of said members in such relationship, and cam-operated means arranged between the laterally spaced portions of said retainable means and having a part movable outwardly to at least the outer edges of the ratchet teeth of said retainable means, to thereby release the retainable means from retention by the projection of said retaining means and to release said members from their retention in such relationship, and to prevent retaining engagement of said projection with the ratchet teeth of said retainable means during relative movement of said members out of such relationship.

16. A device for releasably retaining two relatively movable members in a particular relationship, said device comprising retainable means for association with one of said members, a pair of opposed retaining elements for association with the other of said members and between which retaining elements said retainable means is moved upon the relative movement of said members into said particular relationship, each of said retaining elements having an elastic deformable rubber body which is put under torsional stress by the movement of the retainable means between the retaining elements and said elements being effective, as the result of such torsional stress of their rubber bodies, to retainably engage said retainable means, with consequent retention of said members in said relationship, and means for releasing said retainable means from retention by said retaining elements and hence to release said members from their retention in such relationship.

17. A device for releasably retaining two relatively movable members in a particular relationship, said device comprising retainable means for association with one of said members, a pair of opposed retaining elements for association with the other of said members and between which retaining elements said retainable means is moved upon the relative movement of said members into said particular relationship, each of said retaining elements comprising an elastic deformable rubber body, a rigid support therefor to which said body is anchored, and a projection anchored to said body, the projections of said retaining elements extending toward each other for retaining engagement with said retainable means and being divergently moved by the movement therebetween of said retainable means, with the result that the rubber bodies of said retaining elements are put under torsional stress and the projections of said retaining elements thereby made effective to retainably engage said retainable means, with consequent retention of said members in said relationship, and means for effecting further divergent movement of the projections of said retaining elements to thereby release said retainable means from retention by said projections and hence to release said members from their retention in such relationship.

18. A device for releasably retaining two relatively movable members in a particular relationship, said device comprising retainable means for association with one of said members and provided with opposed abutments, a pair of opposed retaining elements for association with the other of said members and between which retaining elements said retainable means is moved upon the relative movement of said members into said particular relationship, each of said retaining elements comprising an elastic deformable rubber body, a rigid support therefor to which said body is anchored, and a projection anchored to said body, the projections of said retaining elements extending toward each other for retaining engagement with the abutments of said retainable means and being divergently moved by the movement therebetween of said retainable means, with the result that the rubber bodies of said retaining elements are put under torsional stress and the projections of said retaining elements thereby made effective to retainably engage said retainable means, with consequent retention of said members in said relationship, and means for effecting further divergent movement of the projections of said retaining elements to thereby release said retainable means from retention by said projections and hence to release said members from their retention in such relationship.

19. A device for releasably retaining two relatively movable members in a particular relationship, said device comprising retainable means for association with one of said members and provided with opposed abutments, a pair of opposed retaining elements for association with the other of said members and between which retaining elements said retainable means is moved upon the relative movement of said members into said particular relationship, each of said retaining elements comprising an elongated elastic deformable rubber body, a rigid support therefor to which one end portion of said body is anchored, and a projection anchored to said body and located at the other end portion thereof, the projections of said retaining elements extending toward each other for retaining engagement with the abutments of said retainable means and being divergently moved by the movement therebetween of said retainable means, with the result that the rubber bodies of said retaining elements are put under torsional stress and the projections of said retaining elements thereby made effective to retainably engage said retainable means, with consequent retention of said members in said relationship, and means for effecting further divergent movement of the projections of said retaining elements to thereby release said retainable means from retention by said projections and hence to release said members from their retention in such relationship.

20. A device for releasably retaining two relatively movable members in a particular relationship, said device comprising retainable means for association with one of said members and provided with opposed abutments, a pair of opposed retaining elements for association with the other of said members and between which retaining elements said retainable means is moved upon the relative movement of said members into said particular relationship, each of said retaining elements comprising an elastic deformable rubber body, a rigid support therefor on which said body is bonded, and a casing surrounding the periphery of said body and bonded thereto, said casing having a projection, the projections of said retaining elements extending toward each other and being divergently moved by the movement therebetween of said retainable means, with the result that the rubber bodies of said retaining elements are put under torsional stress and the projections of said retaining elements thereby made effective to retainably engage the abutments of said retainable means, with consequent retention of said members in said relationship, and means for effecting further divergent movement of the projections of said retaining elements to thereby release said retainable means from retention by said projections and hence to release said members from their retention in such relationship.

21. A device for releasably retaining two relatively movable members in a particular relationship, said device comprising retainable means for association with one of said members and provided with opposed abutments, a pair of opposed retaining elements for association with the other of said members and between which retaining elements said retainable means is moved upon the relative movement of said members into said particular relationship, said retaining elements having anchored end portions and free end portions which extend toward each other and terminate in retaining projections, each of said retaining elements including an elastic deformable rubber body which is put under torsional stress by the movement of the retainable means between the retaining elements, with the projections of said elements thereby being made effective to retainably engage the abutments of said retainable means, with consequent retention of said members in said relationship, and means for releasing said retainable means from retention by the projections of said retaining elements to thereby release said members from their retention in such relationship.

22. A device for releasably retaining two relatively movable members in a particular relationship, said device comprising retainable means for immovable association with one of said members and provided with opposed sets of teeth, the teeth of one set being advanced with respect to the teeth of the other set, a pair of opposed retaining elements for association with the other of said members and between which elements said retainable means is moved upon relative movement of said members into said particular relationship, each of said retaining elements having a projection for retaining engagement with the teeth of one set of said retainable means, the projections of said retaining elements being in alignment and extending toward each other, each of said retaining elements also having an elastic deformable rubber body which is put under torsional stress by the movement of the retainable means between the projections of the retaining elements, with the result that said retainable means is automatically retained between said retaining elements by the retaining engagement of one or the other of the projections thereof with a tooth in one or the other sets of teeth of said retainable means, with the consequent retention of said members in such particular relationship, and means for releasing said retainable means from retention by said retaining elements to thereby release said members from their retention in such relationship.

23. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means, actuating means for said release means, said release means having a pivotally mounted element normally located in a position to be engaged by said actuating means upon operation thereof, whereby said actuating means normally is effective to bring about the release of the latch means from retention by the keeper means, and manually operable means for swinging the pivotally mounted element of said release means to a position in which it is not engaged by said actuating means upon operation thereof, whereby said actuating means is rendered ineffective to bring about the release of the latch means from retention by the keeper means.

24. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means, actuating means for said release means, said release means having a pivotally mounted element normally located in a position to be engaged by said actuating means upon operation thereof, whereby said actuating means normally is effective to bring about the release of the latch means from retention by the keeper means, and two separate and independent manually operable means for swinging the pivotally mounted element of said release means to a position in which it is not engaged by said actuating means upon operation thereof, whereby said actuating means is rendered ineffective to bring about the release of the latch means from retention by the keeper means.

25. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means, actuating means for said release means and accessible at the outer side of said closure member, said release means having a pivotally mounted element normally located in a position to be engaged by said actuating means upon operation thereof, whereby said actuating means normally is effective to bring about the release of the latch means from retention by the keeper means, and manually operable means accessible at the inner side of the closure member for swinging the pivotally mounted element of said release means to a position in which it is not engaged by said actuating means upon operation thereof, whereby said actuating means is rendered ineffective to bring about the release of the latch means from retention by the keeper means.

26. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means, actuating means for said release means and accessible at the outer side of said closure member, said release means having a pivotally mounted element normally located in a position to be engaged by said actuating means upon operation thereof, whereby said actuating means normally is effective to bring about the release of the latch means from retention by the keeper means, and two separate and independent manually operable means for swinging the pivotally mounted element of said release means to a position in which it is not engaged by said actuating means upon operation thereof, whereby said actuating means is rendered ineffective to bring about the release of the latch means from retention by the keeper means, one of said manually operable means being accessible at the inner side of the closure member and the other of said manually operable means being accessible at the outer side of the closure member and being key-controlled.

27. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means and including an element movable transversely of the plane of the closure member, actuating means for said release means and including a link movable in a plane substantially parallel to the plane of the closure member and having a portion in operative registry with said element, and a substantially rigid part through which said link extends, said link having means which by its engagement with said substantially rigid part upon movement of the link in a plane substantially parallel to the plane of the closure member, causes that portion of the link in registry with said element to also move transversely of the plane of the closure member for engagement with and corresponding transverse movement of said element, with consequent release actuation of said release means and release of the latch means from retention by said keeper means.

28. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means and including an element movable transversely of the plane of the closure member, actuating means for said release means and including a link movable in a plane substantially parallel to the plane of the closure member and having a portion in operative registry with said element and also having an adjacent cam-forming portion, and a substantially rigid part through which said link extends, said substantially rigid part, by engagement of the cam-forming portion of the link therewith upon movement of the link in a plane substantially parallel to the plane of the closure member, causing that portion of the link in registry with said element to also move transversely of the plane of the closure member for engagement with and corresponding transverse movement of said element with consequent release actuation of said release means and consequent release of the latch means from retention by said keeper means.

29. A latch structure for a closure member movable into and out of closed position relative to an adjacent member, said latch structure comprising latch means associated with one of said members, keeper means associated with the other of said members for the releasable retention of the latch means when the closure member is in closed position, means for releasing said latch means from retention by said keeper means and including an element movable transversely of the plane of the closure member, actuating means accessible at the inner side of the closure member for said release means and including a link movable in a plane substantially parallel to the plane of the closure member and having a portion in operative registry with said element, and actuating means accessible at the outer side of the closure member for said release means and having a substantially rigid part through which said link extends, said link having means which by its engagement with said substantially rigid part upon movement of the link in a plane substantially parallel to the plane of the closure member, also causes that portion of the link in registry with said element to move transversely of the plane of the closure member for release actuation of said release means, with consequent release of the latch means from retention by said keeper means and means for moving said link portion out of operative registry with said element to thereby prevent release of the latch means by movement of said link.

30. A device for releasably retaining two relatively movable members in a particular releationship, said device comprising retainable means for immovable association with one of said members, retaining means for association with the other of said members and having an elastic deformable rubber body which is put under torsional stress by said retainable means upon the relative movement of said members into said particular relationship, said retaining means being effective, as the result of such torsional stress of its rubber body, to releasably retain said retainable means when said members are in such particular relationship, with the consequent releasable retention of said members in such relationship, and means for releasing said retainable means from its retention by said retaining means to thereby release said members from their retention in said relationship, said retainable means and said retaining means being in straddling relationship when said retainable means is being retained by said retaining means.

31. A device for releasably retaining two relatively movable members in a particular relationship, said device comprising retainable means for immovable association with one of said members and provided with an abutment, retaining means for association with the other of said members and having an elastic deformable rubber body which is put under torsional stress by said retainable means upon the relative movement of said members into said particular relationship, said retaining means being effective by its engagement with said abutment and as the result of such torsional stress of its rubber body to releasably retain said retainable means when said members are in such particular relationship, with the consequent releasable retention of said members in such relationship, means for releasing said retainable means from its retention by said retaining means to thereby release said members from their retention in said relationship, and safety catch means carried by said retaining means and cooperable with the abutment of said retainable means to prevent the release of said retainable means upon torsional stress failure of the rubber-like body of said retaining means.

32. A device for releasably retaining two relatively movable members in a particular relationship, said device comprising retainable means for immovable association with one of said members and provided with an abutment, retaining means for association with the other of said members and having an elastic deformable rubber body which is put under torsion stress by said retainable means upon the relative movement of said members into said particular relationship, said retaining means being effective by its engagement with said abutment and as the result of such torsional stress of its rubber body to releasably retain said retainable means when said members are in such particular relationship, with the consequent releasable retention of said members in such relationship, means for releasing said retainable means from its retention by said retaining means to thereby release said members from their retention in said relationship, and safety catch means pivotally mounted on said retaining means and cooperable with the abutment of said retainable means to prevent the release of said retainable means upon torsional stress failure of the rubber-like body of said retaining means.

References Cited in the file of this patent

UNITED STATES PATENTS

| Number | Name | Date |
|---|---|---|
| 46,697 | Plumer | Mar. 7, 1864 |
| 318,998 | Maugans | June 2, 1885 |
| 482,794 | Hubbill | Sept. 20, 1892 |
| 780,481 | Crawford | Jan. 17, 1905 |
| 1,252,776 | Camper | Jan. 8, 1918 |
| 1,512,245 | Sloan | Oct. 21, 1924 |
| 1,684,134 | Mesurier | Sept. 11, 1928 |
| 2,056,965 | Herold | Oct. 13, 1936 |
| 2,074,191 | Roethel | Mar. 16, 1937 |
| 2,096,980 | Schjolin | Oct. 26, 1937 |
| 2,118,729 | Hogan | May 24, 1938 |
| 2,221,181 | Dall | Nov. 12, 1940 |
| 2,310,476 | Todd | Feb. 9, 1943 |
| 2,384,276 | Burbridge | Sept. 4, 1945 |
| 2,446,113 | Spiller | Nov. 27, 1948 |
| 2,502,607 | Vinton | Apr. 4, 1950 |
| 2,538,913 | Roethel | Jan. 23, 1951 |